United States Patent [19]

Nevruz

[11] Patent Number: 5,363,693
[45] Date of Patent: Nov. 15, 1994

[54] RECOVERY BOILER LEAK DETECTION SYSTEM AND METHOD

[75] Inventor: Albert A. Nevruz, Lawrenceville, N.J.

[73] Assignee: Union Camp Corporation, Princeton, N.J.

[21] Appl. No.: 932,164

[22] Filed: Aug. 19, 1992

[51] Int. Cl.$^5$ ............................................. G01M 3/08
[52] U.S. Cl. .................................. 73/40.5 R; 73/40; 73/49.1
[58] Field of Search .................. 73/40.5 R, 40, 49.1, 73/49.2 R, 195, 196; 340/605

[56] References Cited

U.S. PATENT DOCUMENTS

| | | | |
|---|---|---|---|
| 3,723,987 | 3/1973 | Barone, Jr. et al. | 73/196 |
| 4,090,179 | 5/1978 | Hirano | 73/196 |
| 4,265,125 | 5/1981 | Mahany | 73/861.03 |
| 4,280,356 | 7/1981 | Stewart | 73/40.5 |
| 4,341,107 | 7/1982 | Blair et al. | 73/195 |
| 4,670,847 | 6/1987 | Furuse | 364/507 |
| 4,788,849 | 12/1988 | Yonemura et al. | 73/40 |
| 4,852,054 | 7/1989 | Mastandrea | 364/509 |
| 4,960,079 | 10/1990 | Marziale et al. | 122/40.5 |
| 4,979,820 | 12/1990 | Shakkottai et al. | 356/129 |
| 4,998,439 | 3/1991 | Shepard | 73/592 |
| 5,031,446 | 7/1991 | Saito et al. | 73/50.5 |

OTHER PUBLICATIONS

J. P. Racine et al., "The Use of Expert Systems for Recovery Boiler Tube Leak Detection" TAPPI, Process Control Conference Mar. 3–5, 1992 Atlanta, Ga.

M. L. Marziale, et al., "Using Sound to Detect Boiler Leaks", TAPPI Journal, pp. 67–71 (Jul. 1989).
G. D. Buckner et al., "Design and Implementation of a Commercial Acoustic Leak–Detection System for Black Liquor Recovery Boilers" TAPPI Journal, pp. 121–127 (Jul. 1990).
Brochure, Acoustic Leak Locator TM The Babcock & Wilcox Company 1991.
T. M. Grace, "Acoustic Leak Detection—One Answer to a Need" PIMA, pp. 53–54, Dec. 1990.
T. M. Grace, "A Safety Focus for the '90s", PIMA Magazine, pp. 52–53, Dec. 1990.
D. S. Kupperman et al. "Characterization of Acoustic Signals from Leaking Intergranular Stress-Corrosion Cracks", Materials Evaluations 47, pp. 1297–1300 (Nov. 1989).
T. Bryson et al., "New Developments in Acoustic Leak Detection for Recovery Boiler" Triple 5 Industries, Oct. 15–16, 1991.

*Primary Examiner*—Hezron E. Williams
*Assistant Examiner*—Helen C. Kwok
*Attorney, Agent, or Firm*—Woodcock Washburn Kurtz Mackiewicz & Norris

[57] ABSTRACT

A method for detecting leakage from a chemical recovery boiler system of the type which includes a recovery boiler and associated output steam piping includes the steps of measuring fluid input into the recovery boiler system; measuring fluid output from the recovery boiler system; and calculating fluid leakage loss based on the differences between the measured fluid input and output values.

16 Claims, 2 Drawing Sheets

RECOVERY BOILER LEAK DETECTION SYSTEM AND METHOD

BACKGROUND OF THE INVENTION

1. Field of the Invention

This invention relates broadly to the field of leak detection for high pressure containment systems. More specifically, this invention relates to an improved system and method for detecting steam leakage from boiler tubes and other areas of black liquor recovery boilers for the paper industry.

2. Description of the Prior Art

The economics of kraft pulping depend heavily on the safe, continuous operation of black liquor recovery boilers. In addition to their role in the regeneration of pulping chemicals, recovery boilers generate a large proportion of the steam required for mill wide operations. Despite the efforts of paper mills, insurance companies, and boiler manufactures, smelt-water expulsions caused by boiler tube leaks continue to pose a threat to normal boiler operations.

Methods to detect water leaks in recovery boilers have been proposed and tested by researchers for several years. Most leak detection schemes monitor the total airborne or structural acoustic energy levels within the boiler to determine if a leak is present. Many limitations of such acoustic leak detection strategies have been documented. Those limitations include the interference which is presented by high background noise levels, the attenuation of acoustic energy which takes place within the boiler, and the limited durability of acoustic sensors in the harsh environment of the boiler.

The most recent generation of acoustic leak detection systems, developed by Westvaco Corporation, utilizes spectral analysis techniques to overcome most of the inherent limitations of other acoustic leak detection schemes. This system is described in the July 1990 edition of the TAPPI Journal.

While the Westvaco system appears to be an improvement over previous generations of acoustic leak detection systems, it is still, to some extent, subject to the above identified disadvantages of acoustic leak detection technology. Moreover, all acoustic leak detection systems are expensive to purchase, deploy and maintain.

It should further be understood that improved detection accuracy is a characteristic which those involved in the design of leak detection systems are constantly striving to improve.

It is clear that there has existed a long and unfilled need in the industry for an improved leak detection system for black liquor recovery boilers which is less expensive, more accurate, and less suspectable to interference from background noise than commercially available acoustic leak detection systems are.

SUMMARY OF THE INVENTION

Accordingly, it is an object of this invention to provide an improved leak detection system for black liquor recovery boilers which is less expensive than commercially available acoustic leak detection systems.

It is further an object of this invention to provide a leak detection system for black liquor recovery boilers which is more accurate than any system which is commercially available.

It is yet further an object of the invention to provide an improved leak detection system for black liquor recovery boilers which is less susceptible to interference from ambient noise levels than the acoustic type of leak detection systems heretofore known and used.

It is yet further an object of this invention to provide an improved leak detection system for black liquor recovery boilers which is more durable than systems presently in use.

To achieve the above and other objects of the invention, a method for detection leakage from a chemical recovery boiler system of the type which includes a recovery boiler and associated output steam piping, according to a first aspect of the invention, includes the steps of (a) measuring fluid input into the recovery boiler system; (b) measuring fluid output from the recovery boiler system; and (c) calculating fluid leakage loss based on the difference between the measured fluid input and output values.

According to a second aspect of the invention, an apparatus for detecting leakage from a chemical recovery boiler system of the type which includes a recovery boiler and associated output steam piping includes structure for measuring fluid input into the recovery boiler system; structure for measuring fluid output from the recovery boiler system; and structure for calculating fluid leakage loss based on the difference between the measured fluid input and output values.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
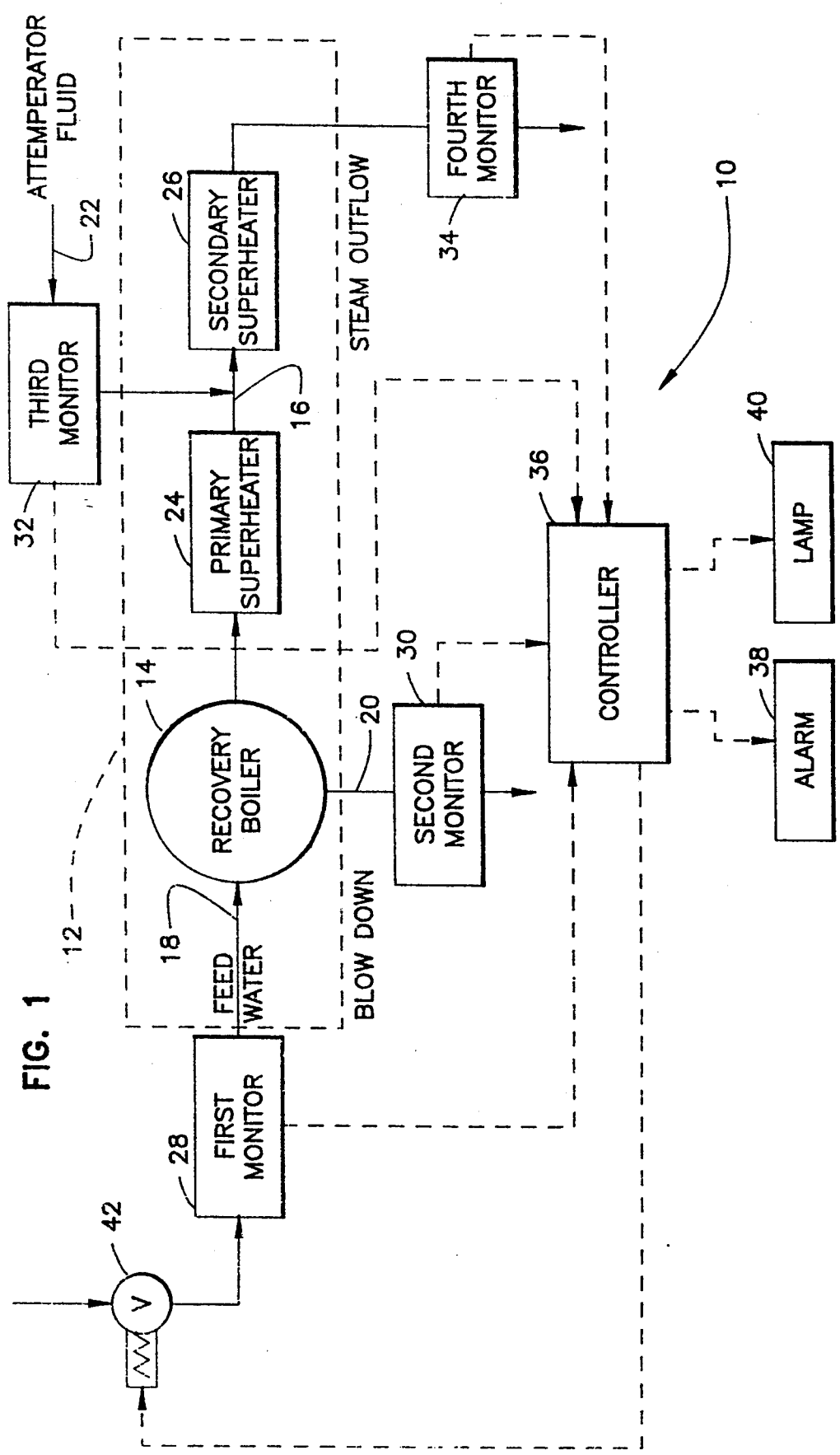
FIG. 1 is a schematic diagram depicting a leak detection system according to a preferred embodiment of the invention.

Referring now to the drawings, wherein like reference numerals designate corresponding structure throughout the views, and referring in particular to FIG. 1, a system 10 for detecting leakage from a chemical recovery boiler system 12 of the type which includes a recovery boiler drum 14 and associated steam output piping 16 is shown. Recovery boiler system 12 typically includes a feed water line 18 for supplying water to the recovery boiler 14 and an outlet line 20 for "blow-down" flow. Boiler system 12 further includes steam output piping 16, which typically leads to a turbine for electricity generation. An inflow line 22 for introducing attemperator fluid, usually water, into the steam piping 16 is also illustrated in FIG. 1. The purpose of the attemperator fluid is to cool down steam which has been heated beyond a predetermined level. Primary and secondary superheaters 24, 26 may also be positioned in the steam output line 16.

A system 10 according to the preferred embodiment of the invention includes a first monitor 28 that is interposed within the feed water line 18 for measuring the mass flow of feed water into the recovery boiler 14 drum. A second monitor 30 is interposed in the blow-down output line 20 for measuring the mass flow of blow-down which may be expelled from the recovery boiler 14 drum. A third monitor 32 is interposed in the attemperator fluid inflow line 22 for measuring the mass flow of attemperator fluid into the steam output piping 16. A fourth monitor 34 is provided in the outflow portion of steam piping 16 for measuring the mass output from the steam piping 16. The monitors 28, 30, 32, 34 are all preferably electronic in nature, and all are constructed and arranged to report electronically to a controller 36, as is schematically depicted in FIG. 1. Controller 36 in turn provides control signals to alarm 38 and, optionally, to a warning lamp 40. Controller 36 further provides a control signal to electronically control a two-position shutoff valve 42, which is interposed in feed water line 18.

As will become apparent from the description of the operation of the preferred embodiment of the invention given below, the invention involves conceptualizing a control volume encompassing the entire recovery boiler system 12, monitoring the mass flow in to and out of that control volume, and thus determining the mass flow of steam leakage which must necessarily be occurring within the recovery boiler system 12. This is preferably carried out calculating long and short term statistics for the drum balance of mass flow, and testing to determine if there is a significant difference between short term and long term averages, which could be attributed to recovery boiler leakage.

During operation of the recovery boiler system 12, the monitors 28, 30, 32, 34 report continuously to controller 36, which samples such data periodically, preferably about every 5 seconds. From this data, controller 36 calculates a drum balance value DB expressed in units of mass per unit time. This calculation, depicted as first step in the flowchart illustrated in FIG. 2, may be expressed as follows:

$$DB = \text{Feed Water Flow} + \text{Attemperator Flow} - (\text{Steam Flow} + \text{Blow Down Flow}) \quad \text{Equation (1)}$$

According to the preferred embodiment of the invention, controller 36 uses a comparison of long term sampling and short term sampling in its statistical analysis of the data received from the monitors 28, 30, 32, 34. In this process, constant $N_1$ refers to the number of samples included in the short term average, and constant $N_2$ refers to the number of samples selected for long term averaging. The constant R refers to the ratio of $N_2$ divided by $N_1$. In the preferred embodiment, controller 36 conducts short term averaging over a 3 minute window, and long term averaging over a 30 minute window. With sampling every 5 seconds, $N_1$ would thus be 36, $N_2$ would accordingly be 360, and R would be equal to 10. As represented below in equation (2) and (3), controller 36 then calculates short term and long term drum balance averages, $\overline{DB}_1$ and $\overline{DB}_2$ periodically, for each sample taken. $T_s$ represents current time in seconds.

$$\overline{DB}_1 = \frac{\sum_{i=T_s-N_1}^{N_1} DB(i)}{N_1} \quad \text{Equation (2)}$$

$$\overline{DB}_2 = \frac{\sum_{i=T_s-N_2}^{N_2} DB(i)}{N_2} \quad \text{Equation (3)}$$

After calculating long and short term drum balance averages $\overline{DB}_1$, $\overline{DB}_2$, controller 36 will calculate the standard deviations for $\sigma_1$, $\sigma_2$ the short term and long term samples, respectively:

$$\sigma_1 = \sqrt{\frac{\sum_{i=T_s-N_1}^{N_1} (DB_1(i) - \overline{DB}_1)^2}{N_1 - 1}} \quad \text{Equation (4)}$$

$$\sigma_2 = \sqrt{\frac{\sum_{i=T_s-N_2}^{N_2} (DB_2(i) - \overline{DB}_2)^2}{N_2 - 1}} \quad \text{Equation (5)}$$

At this point, controller 36 will calculate the pooled estimated standard deviation $\overline{S}$ for the entire data set.

$$\overline{S} = \sqrt{\frac{(N_1 - 1)\sigma_1^2 + (N_2 - 1)\sigma_2^2}{(N_1 - 1) + (N_2 - 1)}} \quad \text{Equation (6)}$$

The significant level of the difference between average short term drum balance and the average long term drum balance can be described as $t_{test}$. $t_{test}$ is calculated as follows in controller 36:

$$t_{test} = \frac{|\overline{DB}_1 - \overline{DB}_2|}{S\sqrt{\frac{1}{N_1} + \frac{1}{N_2}}} \quad \text{Equation (7)}$$

Finally, for each sampling period, controller 36 calculates the leakage $\Delta$ from recovery boiler system 12 by the following calculation:

$$\Delta = \overline{S} \cdot t_{test} \sqrt{\frac{1}{N_1} + \frac{1}{N_2}} \quad \text{Equation (8)}$$

Figure 2:
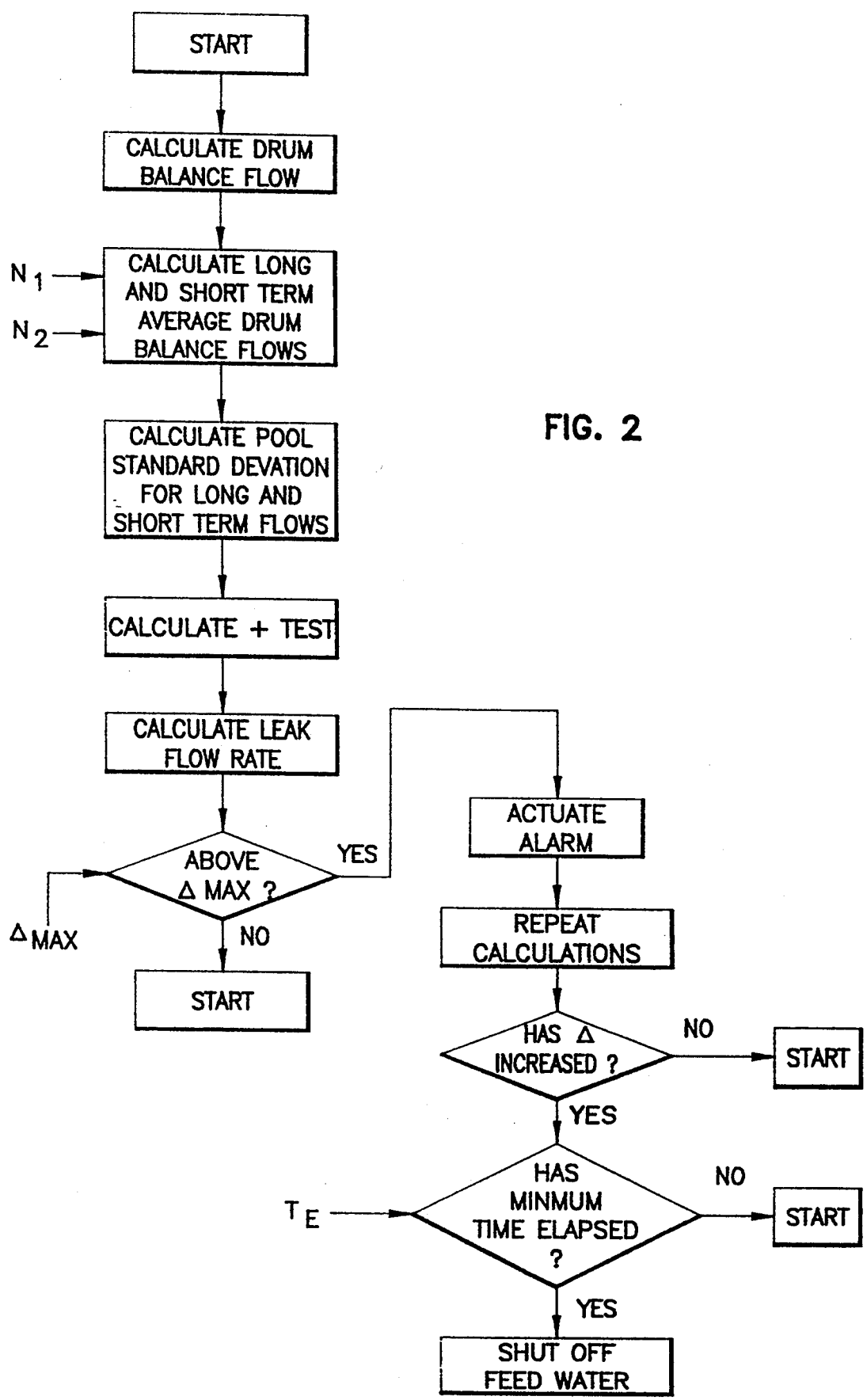
FIG. 2 is a flowchart depicting operation of the embodiment of the invention which is illustrated in FIG. 1.

Referring to the flowchart in FIG. 2, controller 36 then compares the calculated leak flow rate $\Delta$ with a predetermined maximum limit $\Delta_{max}$. If $\Delta$ is not greater than $\Delta_{max}$, controller 36 takes no action, and waits to repeat the above-described calculations with respect to the data which is received from the sensors 28, 30, 32, 34 in the next sampling period. If controller 36 determines that $\Delta$ is greater than $\Delta_{max}$, controller 36 will activate alarm 38 and, optionally, warning lamp 40. At this point, controller 36 will repeat the above-described calculations for the next data set, and for subsequent data sets. At the end of such calculations, as is depicted in the flowchart illustrated in FIG. 2, controller 36 will determine if the calculated leakage rate $\Delta$ has increased with respect to previous measurements. If $\Delta$ has not increased, the process is repeated. If $\Delta$ does increase, controller 36 then determines if a predetermined minimum time $T_e$ has elapsed. If time equal to $T_e$ has not elapsed, the sampling and calculation process is again repeated. If a period of time greater than $T_e$ has elapsed, controller 36 will activate shutoff valve 42 in feed water line 18, to cut off feed water to the recovery boiler 14, thereby shutting down the recovery boiler system 12 automatically. Thus, if the leakage rate continues to increase over a predetermined period of time without human intervention, system 10 act to automatically prevent a leak created explosion from taking place in the recovery boiler system 12.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for detecting leakage from a chemical recovery boiler system of the type which includes a recovery boiler and associated output steam piping, comprising steps of:
    (a) periodically measuring fluid input to a recovery boiler system to obtain data;
    (b) periodically measuring fluid output from a recovery boiler system to obtain data;
    (c) periodically calculating short term average drum balances from the data obtained in steps (a) and (b);
    (d) periodically calculating long term average drum balances from the data obtained in steps (a) and (b);
    (e) calculating a standard deviation for said short term average drum balances;
    (f) calculating a standard deviation for said long term average drum balances;
    (g) using said standard deviation of said short term average drum balances and said long term average drum balances to determine whether a significant difference exists between said short term average and said long term average; and
    (h) indicating an error condition if a significant difference is determined to exist.

2. A method according to claim 1, wherein steps (a) and (b) comprise measuring the rate of fluid mass flow into and, respectively, out of, the recovery boiler system.

3. A method according to claim 1, wherein said indicating step comprises sounding an alarm.

4. A method according to claim 1, wherein step (a) comprises measuring feed water flow into the recovery boiler system.

5. A method according to claim 1, wherein step (a) comprises measuring attemperator fluid flow into the recovery boiler system.

6. A method according to claim 1, wherein step (b) comprises measuring the flow of steam from the recovery boiler system.

7. A method according to claim 1, wherein step (b) comprises measuring the flow of blow-down discharges from the recovery boiler system.

8. A method according to claim 1, wherein step (g) comprises calculating a statistical $t_{test}$ value from said short term average drum balances and said long term average drum balances and said standard deviation of said short term average drum balances and said long term average drum balances.

9. An apparatus for detecting leakage from a chemical recovery boiler system of the type which includes a recovery boiler and associated output steam piping, comprising:
    means for periodically measuring fluid input to a recovery boiler system to obtain data;
    means for periodically measuring fluid output from a recovery boiler system to obtain data;
    means for periodically calculating a short term average drum balances from said data that is obtained by said input and output measuring means;
    means for periodically calculating a long term average drum balances from the data that is obtained by said input and output measuring means;
    means for calculating a standard deviation for said short term average drum balances;
    means for calculating a standard deviation for said long term average drum balances;
    means for using said standard deviation of said short term average drum balances and said long term average drum balances to determine whether a significant difference exists between said short term average and said long term average; and
    means for indicating an error condition if a significant difference is determined to exist.

10. An apparatus according to claim 9, wherein said fluid input measuring means and said fluid output measuring means both comprise means for measuring the rate of fluid mass flow into and, respectively, out of, the recovery boiler system.

11. An apparatus according to claim 9, wherein said indicating means comprises an alarm.

12. An apparatus according to claim 9, wherein said fluid input measuring means is constructed and arranged to measure feed water flow into the recovery boiler system.

13. An apparatus according to claim 9, wherein said fluid input measuring means is constructed and arranged to measure attemperator fluid flow into the recovery boiler system.

14. An apparatus according to claim 9, wherein said fluid output measuring means is constructed and arranged to measure the flow of steam from the recovery boiler system.

15. An apparatus according to claim 9 wherein said fluid output measuring means is constructed and arranged to measure the flow of blow-down discharges from the recovery boiler system.

16. An apparatus according to claim 9, wherein said means for using said standard deviation of said short term average drum balances and said long term average drum balances to determine whether a significant difference exists between said short term average and said long term average comprises means for calculating a $t_{test}$ value from said short term average drum balances and said long term average drum balances and said standard deviation of said short term average drum balances and said long term average drum balances.

* * * * *